United States Patent
Haumont

(10) Patent No.: US 7,702,326 B2
(45) Date of Patent: Apr. 20, 2010

(54) COMMUNICATION METHOD AND SYSTEM

(75) Inventor: Serge Haumont, Helsinki (FI)

(73) Assignee: Nokia Corporation, Espoo (FI)

(*) Notice: Subject to any disclaimer, the term of this patent is extended or adjusted under 35 U.S.C. 154(b) by 339 days.

(21) Appl. No.: 10/181,040

(22) PCT Filed: Dec. 22, 2000

(86) PCT No.: PCT/EP00/13207

§ 371 (c)(1),
(2), (4) Date: Nov. 13, 2002

(87) PCT Pub. No.: WO01/52578

PCT Pub. Date: Jul. 19, 2001

(65) Prior Publication Data

US 2003/0092390 A1    May 15, 2003

(30) Foreign Application Priority Data

Jan. 14, 2000   (GB) ................................ 0000927.4

(51) Int. Cl.
*H04Q 7/20* (2006.01)
(52) U.S. Cl. ................................ 455/423; 455/422.1
(58) Field of Classification Search ................ 455/8, 455/67.7, 67.11, 423–425, 406, 408, 422.1, 455/67.13
See application file for complete search history.

(56) References Cited

U.S. PATENT DOCUMENTS

| | | | |
|---|---|---|---|
| 5,065,399 A | | 11/1991 | Hasegawa et al. .......... 371/11.2 |
| 5,644,706 A | | 7/1997 | Ruigrok et al. |
| 5,793,418 A | * | 8/1998 | Bogdanowicz et al. ........ 348/97 |
| 5,940,755 A | * | 8/1999 | Scott ........................ 455/426.1 |
| 5,978,363 A | * | 11/1999 | Dimitrijevic et al. ........ 370/319 |
| 6,011,780 A | * | 1/2000 | Vaman et al. ................ 370/237 |
| 6,012,152 A | | 1/2000 | Douik et al. .................. 714/26 |
| 6,023,619 A | * | 2/2000 | Kaminsky .................... 455/411 |
| 6,169,907 B1 | * | 1/2001 | Chang et al. ................. 455/522 |
| 6,188,887 B1 | * | 2/2001 | Joong et al. .................. 455/417 |
| 6,256,476 B1 | * | 7/2001 | Beamish et al. ............ 340/7.36 |
| 6,317,597 B1 | * | 11/2001 | Baker et al. .............. 455/426.1 |
| 6,374,079 B1 | * | 4/2002 | Hsu .......................... 455/11.1 |
| 6,477,370 B1 | * | 11/2002 | Sigler et al. ................. 455/427 |
| 6,487,192 B1 | * | 11/2002 | Wakizaka .................... 370/342 |

(Continued)

FOREIGN PATENT DOCUMENTS

| | | |
|---|---|---|
| EP | 0 699 008 A1 | 2/1996 |
| WO | WO 98/36456 | 8/1998 |
| WO | 99/37080 | 7/1999 |

OTHER PUBLICATIONS

Garijo. M., et al.: "A Multiagent System for Cooperative Network-Fault Management"; XP002068055: Proceedings of the International Conference on the Practical Application of Intelligent Agents and Multi-Agent Technology. Apr. 22, 1996: pp. 279-294.

*Primary Examiner*—CongVan Tran
(74) *Attorney, Agent, or Firm*—Squire, Sanders & Dempsey, LLP

(57) ABSTRACT

A telecommunication system comprises a mobile station, or handset, usable by a user, at least one switching center connectable to the mobile station. The system is arranged such that when an attempt to establish a connection between the mobile station and the switching center fails, information relating to the cause of the connection failure is provided to the mobile station. The mobile station is able to provide this information to help a center.

38 Claims, 2 Drawing Sheets

U.S. PATENT DOCUMENTS

| | | | |
|---|---|---|---|
| 6,501,947 B1 * | 12/2002 | Hunzinger et al. | 455/414.1 |
| 6,567,657 B1 * | 5/2003 | Holly et al. | 455/408 |
| 6,615,381 B1 * | 9/2003 | Fukuda et al. | 714/746 |
| 6,618,398 B1 * | 9/2003 | Marchetti et al. | 370/475 |
| 6,729,929 B1 * | 5/2004 | Sayers et al. | 455/446 |
| 6,751,205 B2 * | 6/2004 | Menon et al. | 370/328 |
| 6,898,279 B1 * | 5/2005 | Baker et al. | 379/355.08 |
| 2002/0057788 A1 * | 5/2002 | Cox et al. | 379/265.01 |

* cited by examiner

COMMUNICATION METHOD AND SYSTEM

FIELD OF THE INVENTION

The present invention relates to a communication method and system. In particular, but not exclusively, the present invention relates to a data communication system and method.

BACKGROUND TO THE INVENTION

Wireless cellular networks are known in which the area covered by the network is divided into cells. Each cell has a base station associated therewith, which is arranged to communicate with mobile stations or other suitable devices in the respective cell. The communications between the mobile stations and the base stations use radio frequency signals. Typical mobile stations are arranged to provide voice and data services.

The GPRS standard allows mobile stations to send and receive data. Using this standard, it is possible to send and receive faxes and also to make connections with the Internet, usually to download data therefrom. It is also possible with the GPRS standard to receive and send email messages. With these data services, particularly those where the user is accessing the Internet, the user may find that it is not possible to establish a connection. The failure to establish a connection may be due to problems with the network, the result of a user error when establishing connection, be a service which is not available, or because the requested service is not available to the particular user. Currently, the user either succeeds in establishing a connection or fails. The user will not know why a connection has failed. If a user fails to establish a connection, he will usually repeatedly try to establish the connection. Repeated failure to establish a connection, for example due to a user error or the like can be particularly frustrating for the user.

An additional problem is that if the user contacts the network operator to request assistance, it is not simple for the network operator to determine the cause of the failure to establish a connection.

SUMMARY OF THE INVENTION

It is therefore an aim of embodiments of the present invention to address the problems discussed previously.

According to a first aspect of the present invention there is provided a communications system comprising a first node usable by a user, at least one second node, said first node being connectable with the second node, said system being arranged such that when a connection failure occurs between said first node and said second node, information relating to the cause of said connection failure is provided to said first node, said first node comprising means for providing information relating to said connection failure to a third node.

According to a second aspect of the present invention there is provided a communication method comprising the steps of determining when a connection failure occurs between a first node and a second node; providing information relating to the cause of said connection failure to the first node; and providing information relating to the connection failure from the first node to a third node.

According to a third aspect of the present invention there is provided a node for use in a communication system comprising said node and at least two further nodes, said node and one of said further nodes being connectable, wherein said node is arranged to receive information when a connection failure occurs between said node and said one of said further nodes, said node comprises means for providing information relating to the cause of said connection failure to another one of said further nodes.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF EMBODIMENTS OF THE INVENTION

Figure 1:
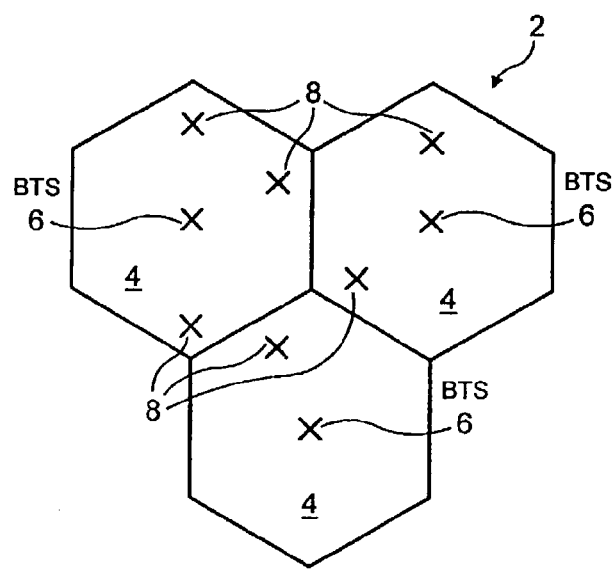
FIG. 1 shows a cellular network with which embodiments of the present invention can be used.

Reference is first made to FIG. 1, which shows part of a wireless cellular network with which embodiments of the present invention can be used. The area covered by the network 2 is divided into a plurality of cells 4. Each of the cells has a base station subsystem 6 associated with it. The base station subsystem 6 is arranged to send signals to and receive signals from mobile stations 8 or other user equipment in the cell associated with the base station subsystem 6. The signals sent between the mobile station 8 and the base station subsystem 6 allow voice and data connections to be established. The connection between the mobile stations 8 and the base station subsystems 6 is a radio connection.

Figure 2:
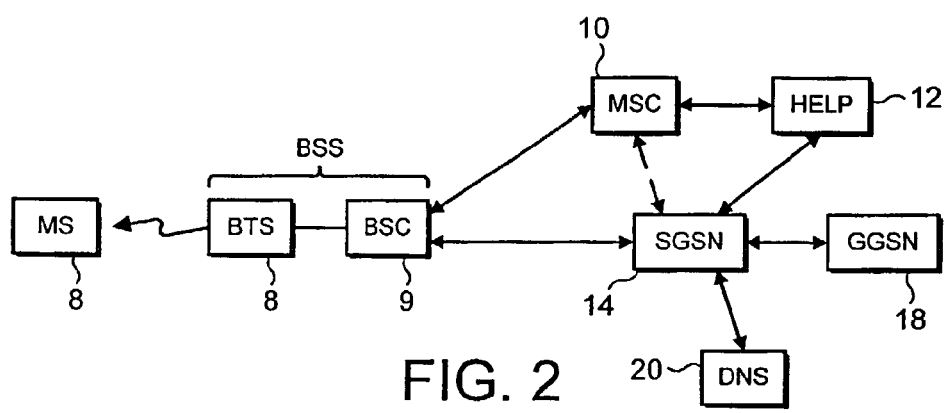
FIG. 2 shows a schematic view of a GPRS system with which embodiments of the present invention can be used.

Reference will now be made to FIG. 2, which shows part of a GPRS network with which embodiments of the present invention can be used. The mobile station 8 is able to communicate with the base transceiver station 8 via a radio connection. The base transceiver station is connected to a base station controller 9 which is in turn connected to a mobile services switching centre MSC 10. The mobile services switching centre 10 is generally used for voice connections which the mobile station makes to third parties. The mobile services switching centre 10 is connected to a help centre 12. It should be appreciated that the mobile services switching centre 10 also is used when certain types of data service are used. For example, the mobile services switching centre 10 is used with the short message service SMS. The short message service allows the mobile station to receive from and to send to third parties short messages. This is controlled by the mobile services switching centre 10.

The base station controller 9 is also connected to a serving GPRS support node SGSN 14 which is used for GPRS services. The SGSN 14 keeps track of the mobile station's location and performs security functions and access control. The SGSN 14 is also connected to a help centre 12. This help centre may be the same or different to the help centre 12.

The SGSN 14 is also connected to a gateway GPRS support node GGSN 18. The GGSN 18 acts as a gateway and allows connections to be made to different networks or the like. Finally, the SGSN 14 is also connected to a domain name system DNS 20. The domain name server 20 stores addresses for site names. Thus the user will enter an access point (AP) name into his mobile station. The domain name server is able to take this name and provide the address of the site in a form which can be understood by various of the network elements.

Figure 3:
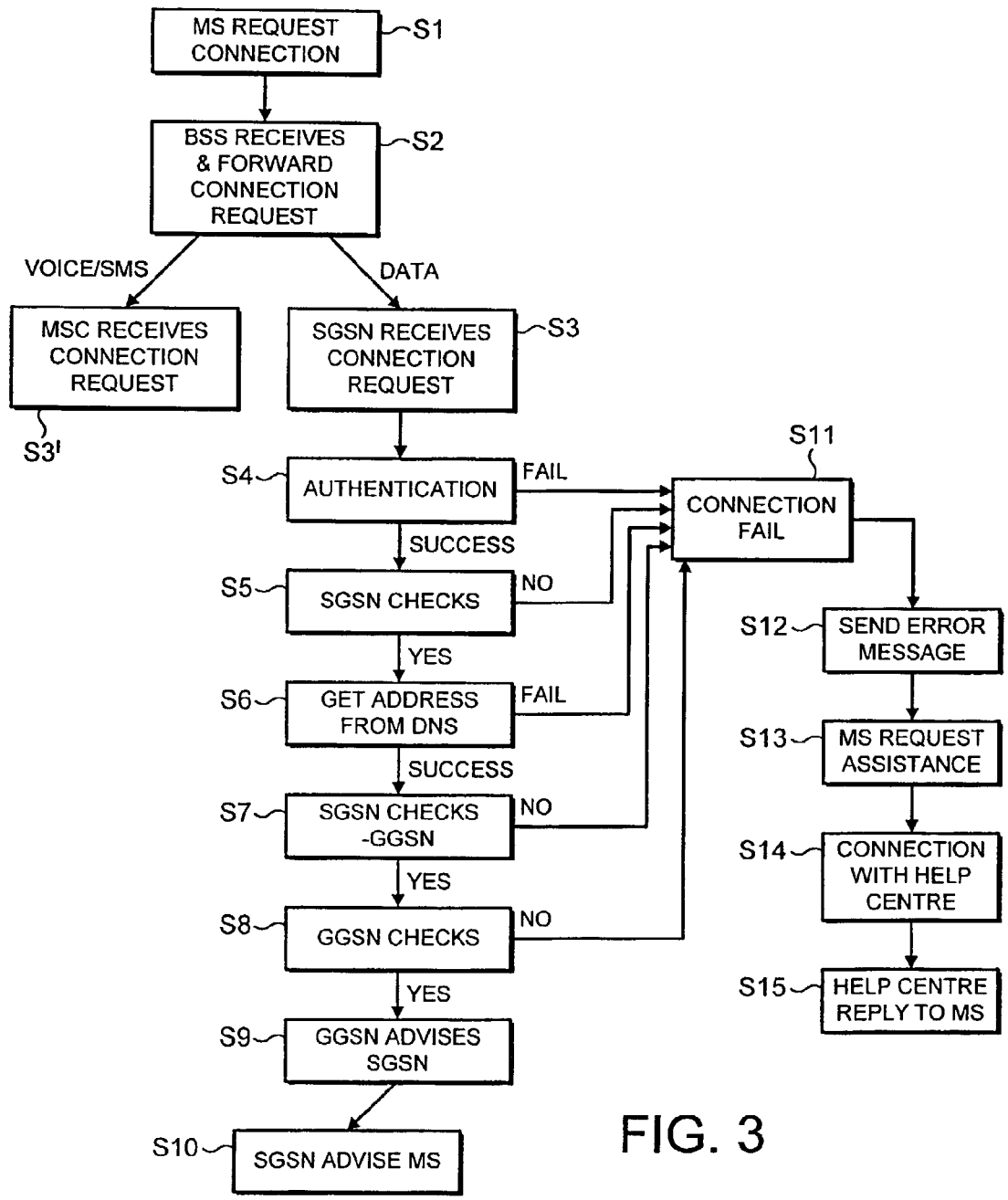
FIG. 3 shows a flow chart of the steps carried out in embodiments of the present invention.

Reference is now made to FIG. 3, which describes the steps embodying the present invention. In step S1 the mobile station requests a connection. This example is a PDP context activation request. Any other type of connection request may be provided. This connection may be with another telephone, mobile all connected to a fixed network or may be to an internet location or the like.

In step S2, the base station subsystem receives the connection request from the mobile station. The base transceiver station will forward data connection requests to the SGSN and voice connection requests to the mobile services switching centre. Short message service connection requests can be optionally sent to the mobile services switching centre or to the SGSN. The data connection request will be considered, by way of example. A voice connection request may be forwarded to the mobile services switching centre in step S3'. The remaining steps are not described but may be similar to those outlined hereinafter relating to the data connection.

In step S3, the SGSN receives the connection request. In step S4, the SGSN may carry out an authentication procedure. This is a straight forward procedure in which the SGSN simply checks the identity of the mobile station in question. For an attach, the SGSN will need to exchange information with the mobile station and will need to access information from a separate location, such as an authentication centre. It should be appreciated that in some embodiments of the present invention, this authentication step may be omitted if the mobile station has attached to the network earlier and has previously been authenticated. A more complex procedure may be carried out in alternative embodiments.

If the authentication procedure is successful, step S5 is carried out. In step S5, the SGSN checks to see whether or not the subscriber is able to make the type of connection which he is attempting. For example, the SGSN will check to see whether or not the mobile station supports a connection to the Internet or the like and/or checks to see whether or not the mobile station has subscribed to the necessary operator services which permit the mobile station to use the requested service. It should be appreciated that the subscription may contain many parameters such as: access point name (APN); packet data protocol (PDP) type; fixed or dynamic address; quality of service profile; access restricted to home public land mobile network (PLMN) GGSN etc. Accordingly a PDP context request may be rejected for a number of different reasons in step S5. If this check is successful, and the mobile station is attempting to connect to the internet, the next step is step S6.

In step S6, the SGSN takes the access point name with which the mobile station is requesting a connection and obtains from the domain name system (DNS) 20 the address of the associated site. The name is received by the SGSN from the mobile station. Provided that the mobile station has not made an error in the name of the site and that the domain name service is working, the SGSN will receive from the domain name system 20 the associated address. The address provided by the domain name system is the GGSN address. A second domain name system may be used after the GGSN to retrieve the Internet address.

In step S7, the SGSN may make a further check to see if the user is permitted to be connected to the particular GGSN. For example, the subscriber may be limited to access only the Home GGSN. Alternatively, company employees using a company mobile station may be prevented from accessing certain sites, such as entertainment sites or the like. There may be alternative reasons why the user is not permitted to be connected to the GGSN.

In step S8, assuming that the subscriber is permitted to connect with the GGSN the PDP context activation request is forwarded to the GGSN. The GGSN will further check if a PDP context can be established for the mobile station. The user may be authenticated by a password using a radius server. The GGSN may also or alternatively check other parameters such as a selection mode parameter. The connection may also fail if the GGSN has a lack of resource. If the PDP context request can be accepted, the GGSN advises the SGSN in step S9. The SGSN advises the mobile station n in step S10. In that way, the mobile station is able to connect to the required GGSN.

In the method described in FIG. 3, there may be a number of possible reasons why a connection is not established. For example, the authentication of step S4 might fail, the subscriber may not be a permitted subscriber able to make the type of connection requested and step S5 may not be successful, the name of the site provided by the mobile station may be incorrect, for example due to a spelling mistake or the like so it is not possible to obtain an address from the domain name server 20 or the domain name server is not operating correctly, the service requested for the subscriber is not a permitted one or the GGSN check may fail. In all of those cases (steps S4 to S9), S11 is the next step which determines that the connection has failed and why. When a connection has failed, in step S12, an error message is sent to the mobile station. This error message may tell the mobile station that the connection has failed and include information identifying the reason for failure. A message is preferably displayed on the display which allows the user to determine that the connection has failed. The error message preferably also asks the user if he would like assistance. It should be appreciated that the reason for the failure may not be displayed and/or may not be in a form which is understood by the user. In some embodiments of the invention, the reason for the failure is not sent to the mobile station.

In step S13, the user is able to indicate using the device interface that he would like assistance. The mobile station will then send a message indicating that it requests assistance. This message will in one embodiment of the present invention be a short message service SMS message which is sent to a prerecorded help centre number. Typically, the message will include the mobile identity. The mobile station identification may be the IMSI number, the mobile station ISDN number or any other suitable identification. The error message also includes the reason as to why the connection has failed. The message may also include the failure event.

The message also preferably includes configuration information relating to the mobile station. This information may include one or more of the following types of information:

the quality of service requested by the user; the PDP (packet data protocol) address used by the mobile station to make the connection; the packet data protocol type used by the user; and the access point name (APN).

In step S14 the short message service message SMS generated by the mobile station is transmitted to the base transceiver station. This short message service data message can be forwarded to the mobile services switching centre and from there to the help centre associated therewith. A connection is established with the help centre. The short service message may be sent via the SGSN.

It should be appreciated that in preferred embodiments of the present invention, the mobile station is arranged to automatically generate the SMS message if the user indicates that he requires assistance. In an alternative embodiment of the present invention, the user may assist in the generation of the short message service message. In yet another alternative embodiment of the present invention, the mobile station is arranged to automatically generate the SMS message once the mobile station has received an indication of an error. In this latter case, the user would not be required to indicate via the interface whether or not he required assistance.

In a further embodiment of the invention, as soon as it is determined that there is an error, the mobile station is automatically provided with assistance without being first advised that there is an error.

In step S15 the help centre is able to determine from the message received from the mobile station the cause of the error. The help centre can do a number of things. For example, the help centre can generate a message, for example a short message service message which is sent to the mobile station explaining to the user the reason for the failure. If necessary, the message can indicate what needs to be changed, either a mobile station setting or information input by the user.

In a second alternative, the help centre can send information to alter the settings of the mobile station in order to permit the error to be corrected. This can be done using a MEXE or SIM tool kit.

In a third possibility, a telephone connection is established with the help centre so that an advisor at the help centre is able to advise the user of the mobile station as to the problem.

In a fourth possibility, the help centre may send a message to the user advising him as to a code or information relating to the error. The user of the mobile station can then call the help centre and have the error associated with the code received by the user explained by the help centre.

It should be appreciated that in embodiments of the present invention, one or more of the options outlined above may be used.

Embodiments of the present invention are particularly useful with more complex services such as GPRS and the proposed third generation standard (UMTS). The user will generally have to perform more complex steps in order to configure the connection.

In the case of the GPRS and UMTS system, problems can occur with the mobile station configuration, a fault with the base station controller, a fault with the SGSN, a fault with the GGSN, a fault with the internet service provider or there may be a normal case of operation but where the subscriber data has introduced a limitation and so on.

By way of example, a list of possible causes of connection failure in the case of an unsuccessful GPRS packet data protocol (PDP) context activation will now be explained. This is as described in the associated ETSI specification No 04.08.

1. The access point name APN is missing or incorrect.
2. The PDP address or PDP type is unknown.
3. The user authentication has failed.
4. The activation has been rejected by the GGSN. The GGSN may carry out its own authentication and this may have been rejected.
5. The activation has been rejected for an unspecified reason.
6. The service option requested by the user is not supported.
7. The user does not subscribe to the requested service.
8. The service requested by the user is temporarily out of order or unavailable.
9. The network service access point identifier (NSAPI) is already used.
10. There is a regular deactivation—for example if the quality of service of the connection is not acceptable, there will be an automatic deactivation.
11. The available quality of service has not been accepted by the mobile station and therefore the connection is not made.
12. There has been a network failure.
13. Reactivation is required. This will require the mobile station to detach and then reattach to the network.

The following messages relate to the protocol associated with PDP context activation:

14. The transaction identifier value used is invalid.
15. The message is semantically incorrect.
16. The mandatory information in the message is invalid.
17. The message type is nonexistent or not implemented.
18. The message type is not compatible with the protocol state.
19. The information element is nonexistent or not implemented.
20. There is a conditional information element error. In other words, there is an error in the non-mandatory information.
21. The message is not compatible with the protocol state.
22. There is a protocol error of an unspecified reason.

The operator may not charge the user for the message, sent automatically by the MS. This may be done by informing the billing operator to deduct a charge for one message. Alternatively, the operator may automatically charge the user. The help centre can be arranged so that the charges associated with the message sent to the user are deducted from the user's bill.

It should be appreciated that whilst embodiments of the present invention have been described in the context of a GPRS system, embodiments of the present invention can be used with any other data system. Embodiments of the present invention can be used with data packet systems or non packet data systems. Alternative embodiments of the present invention can also be used with voice systems or systems which provide voice and data communications.

Embodiments of the present invention have been described in association with wireless telecommunication systems. However, embodiments of the present invention can also be used in conjunction with wired telecommunication systems.

Embodiments of the present invention have been described in the context of a network which uses mobile stations. The mobile stations may be mobile telephones, portable computers or any other suitable device. It should also be appreciated that embodiments of the present invention are also applicable to any type of user equipment which is moveable or in a fixed location.

It should be appreciated that the error messages which have been described above in the context of a PDP context activation or by way of example only. Any suitable error message can be provided to the mobile station.

The method described in relation to FIG. 3 has described error messages resulting only from errors occurring in an PDP context activation. However, it should be appreciated that embodiments of the present invention have much broader application and can be used in any scenario. Embodiments of the present invention can be used wherever there is a problem in establishing a connection, whether it be a voice or a data or any other type of connection, to advise the user as to the nature of the error and/or to assist the user in correcting the error.

When an attach procedure fails in GSM/GPRS or UMTS, a short message service SMS message can be sent to the Help Center. This is possible because, if the attach to the mobile services switching centre services fail, the mobile may be capable of attaching to the SGSN services which also support SMS. Alternatively if the attach procedure to the SGSN service fails the mobile may be capable of attaching to the mobile service switching centre services which also supports SMS.

Whilst the preferred embodiment of the present invention has been described in the context of a PDP context activation request, embodiments of the present invention can be used in the context of any other request whether it be a connection request or otherwise. Embodiments of the invention can alternatively or additionally be used whenever there is a failure or change to the service.

Embodiments of the present invention can also be used in other error conditions. For example, embodiments of the present invention can be used wherever there is a problem. For example, if a connection is broken, the user can be advised as to the reason for this failure. For example, this may be because a user has moved from the coverage of one operator to the coverage area of another operator and the other operator does not support the service being used by the mobile station.

Embodiments of the present invention have used SMS messages as these may be sent and received even if other types of connection can not be set up. However, alternative embodiments of the invention may use any other suitable service such as anonymous access, voice or a data connection.

The invention claimed is:

1. An apparatus comprising:
a receiver configured to receive information from a communications system when a connection failure occurs between said apparatus and at least one node, said received information relating to a cause of said connection failure; and
a transmitter configured to provide to a management entity information comprising said received information relating to the cause of connection failure, said transmitted information enabling said management entity to provide assistance to said apparatus to assist a user of said apparatus in correcting an error relating to the cause of said connection failure.

2. The apparatus as claimed in claim 1, wherein said information received by the apparatus causes the apparatus to request if the user requires assistance from the management entity.

3. The apparatus as claimed in claim 1, wherein the receiver is further configured to receive information from said management entity to change at least one setting of the apparatus.

4. The apparatus as claimed in claim 1, wherein the receiver is further configured to receive from said management entity a message advising as to the cause of the failure.

5. The apparatus as claimed in claim 1, wherein a connection is established between the apparatus and the management entity so that the user is able to communicate with a helper at the management entity.

6. The apparatus as claimed in claim 1, wherein said management entity is further configured to ensure that said user receives charges associated with said assistance.

7. The apparatus as claimed in claim 1, wherein said communications system comprises a wireless telecommunications system.

8. The apparatus as claimed in claim 7, wherein said communications system comprises a cellular telecommunications system.

9. The apparatus as claimed in claim 1, wherein said communications system supports voice connections.

10. The apparatus as claimed in claim 1, wherein said communications system supports data connections.

11. The apparatus as claimed in claim 10, wherein said communications system comprises a general packet radio service system.

12. The apparatus as claimed in claim 11, wherein said at least one node comprises a servicing general packet radio service support node.

13. The apparatus as claimed in claim 1, wherein said information is provided by a short message service.

14. The apparatus as claimed in claim 1, wherein said apparatus further comprises user equipment.

15. The apparatus as claimed in claim 14, wherein said user equipment comprises a mobile station.

16. The apparatus as claimed in claim 1, wherein said communications system comprises a wired telecommunications system.

17. The apparatus as claimed in claim 1, wherein said connection failure occurs for one or more of the following reasons:
incorrect information input by said user to said apparatus;
an unavailable service requested by said user;
the user does not subscribe to a requested service;
incorrect settings of said apparatus; and
errors at the at least one node or any other node.

18. A method comprising:
receiving at an apparatus information relating to a cause of a connection failure for a connection between the apparatus and at least one node;
transmitting from said apparatus to a management entity said information relating to a cause of the connection failure; and
receiving assistance at said apparatus from the management entity to assist a user of said apparatus in correcting an error relating to the cause of said connection failure.

19. A system, comprising:
an apparatus usable by a user; and
at least one node, said apparatus being connectable with the at least one node,
said system being configured such that when a connection failure occurs between said apparatus and said at least one node, information relating to a cause of said connection failure is provided to a management entity, said management entity providing assistance to the apparatus to assist the user of said apparatus in correcting an error relating to the cause of said connection failure.

20. A method, comprising:
determining when a connection failure occurs in a communications system, between an apparatus usable by a user and at least one node;
providing information relating to a cause of said connection failure to a management entity; and
providing assistance from said management entity to said apparatus, to assist the user of said apparatus in correcting an error relating to the cause of said connection failure.

21. An apparatus, comprising:
receiving means for receiving information from a communications system when a connection failure occurs between said apparatus and at least one node, said received information relating to a cause of said connection failure; and
transmitting means for transmitting to a management entity information comprising said received information relating to the cause of connection failure, said transmitted information enabling said management entity to provide assistance to said apparatus to assist a user of said apparatus in correcting an error relating to the cause of said connection failure.

22. The method as claimed in claim 18, further comprising: when said information is received by the apparatus, the apparatus requesting if the user requires assistance from the management entity.

23. The method as claimed in claim 18, further comprising: receiving information from said management entity to change at least one setting of the apparatus.

24. The method as claimed in claim 18, further comprising: receiving from said management entity a message advising as to the cause of the failure.

25. The method as claimed in claim 18 further comprising: establishing a connection with the management entity so that the user is able to communicate with a helper at the management entity.

26. The method as claimed in claim 18, wherein said management entity is configured to ensure that said user receives charges associated with said assistance.

27. The method as claimed in claim 18, wherein said communications system comprises a wireless telecommunications system.

28. The method as claimed in claim 27, wherein said communications system comprises a cellular telecommunications system.

29. The method as claimed in claim 18, wherein said communications system supports voice connections.

30. The method as claimed in claim 18, wherein said communications system supports data connections.

31. The method as claimed in claim 30, wherein said communications system comprises a general packet radio service system.

32. The method as claimed in claim 31, wherein said at least one node comprises a servicing general packet radio service support node.

33. The method as claimed in claim 18, wherein said information is provided by a short message service.

34. The method as claimed in claim 18, wherein said apparatus further comprises user equipment.

35. The method as claimed in claim 34, wherein said user equipment comprises a mobile station.

36. The method as claimed in claim 18, wherein said communications system comprises a wired telecommunications system.

37. The method as claimed in claim 18, wherein said connection failure occurs for one or more of the following reasons:
   incorrect information input by said user to said apparatus;
   an unavailable service requested by said user;
   the user does not subscribe to a requested service;
   incorrect settings of said apparatus; and
   errors at the at least one node or any other node.

38. The method as claimed in claim 18, wherein said management entity communicates with said apparatus via said at least one node.

* * * * *